United States Patent [19]

Lorenz et al.

[11] Patent Number: 4,739,042
[45] Date of Patent: Apr. 19, 1988

[54] HALFTONE GRAVURE PRINTING INKS CONTAINING PYRIDONE AZO DYESTUFFS

[75] Inventors: Manfred Lorenz, Cologne; Artur Haus, Overath, both of Fed. Rep. of Germany

[73] Assignee: Bayer Aktiengesellschaft, Leverkusen, Fed. Rep. of Germany

[21] Appl. No.: 893,114

[22] Filed: Aug. 4, 1986

[30] Foreign Application Priority Data

Aug. 8, 1985 [DE] Fed. Rep. of Germany ....... 3528422
Jan. 9, 1986 [DE] Fed. Rep. of Germany ....... 3600387

[51] Int. Cl.$^4$ .................. C09B 29/42; C09B 33/12; C09B 43/30; C09D 11/02
[52] U.S. Cl. .................................. 534/649; 534/573; 534/595; 534/755; 534/756; 534/758; 534/759; 534/772; 106/22; 106/23
[58] Field of Search ............... 534/756, 758, 759, 649, 534/755, 573 L; 106/22, 23

[56] References Cited

U.S. PATENT DOCUMENTS 4,329,283  5/1982  Reel et al. .................... 534/756 X

FOREIGN PATENT DOCUMENTS 2434432  2/1975  Fed. Rep. of Germany ...... 584/759

Primary Examiner—Floyd D. Higel
Attorney, Agent, or Firm—Sprung Horn Kramer & Woods

[57] ABSTRACT

Halftone gravure printing inks containing pyridone azo dyestuffs wherein the dyestuffs are obtained by reacting a pyridone dyestuff of the formula

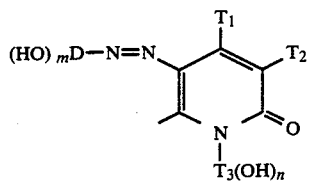

with a dicarboxylic or polycarboxylic acid or a pyridone azo dyestuff of the formula

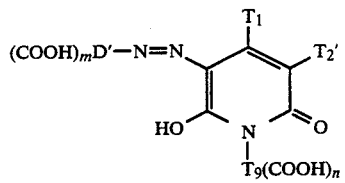

with a-dihydroxy or polyhydroxy compound.

3 Claims, No Drawings

HALFTONE GRAVURE PRINTING INKS CONTAINING PYRIDONE AZO DYESTUFFS

The invention relates to a process for the preparation of halftone gravure printing inks using pyridone azo dyestuffs, and to new pyridone azo dyestuffs.

Halftone gravure printing inks, which are used, for example, for printing illustrated magazines and trade catalogues, are low-viscosity liquids which preferably consist of 5–10% of pigment, 25–40% of resin and solvent (see Ullmanns Encyklopadie der technischen Chemie ("Ullmann's Encyclopedia of Industrial Chemistry"), 4th Edition, Volume 10, p. 196; Verlag Chemie, Weinheim 1979). These gravure printing inks dry through evaporation of the solvents, whereby the resin and the pigment remain behind on the print carrier. It is important that the pigment thereby remains on the surface of the print carrier as far as possible, since too deep penetration of the colouring agent into the print carrier results in a reduction in the apparent intensity of colour. When thin and uncoated paper is printed, the result, caused by excessively deep penetration of the colouring agent, can even be striking through to the reverse side of the paper, which impairs both the depth of colour and the gloss and, additionally, makes clean printing on the reverse side more difficult. By using special pigments in the preparation of halftone gravure printing inks, the pigment particles are retained on or near the surface, as a result of the filter action of the absorbent substrate, but, because of the low viscosity of the printing inks and the rapid penetration caused thereby, strike-through phenomena can occur here too. These difficulties are to be expected all the more if soluble dye-stuffs are used instead of pigments in the preparation of halftone gravure printing inks. Since the filter action of the print carrier is lacking in this case, the soluble dyestuff can penetrate particularly readily and deeply. This is the reason why soluble colorants have hitherto only found a limited use in halftone gravure printing processes, for example as so-called toning dyestuffs together with a preponderant proportion of pigments. Particularly on thin and absorbent paper, a larger amount of soluble dyestuffs would cause striking through and showing through.

It has now been found, surprisingly, that certain pyridone azo dyestuffs are also suitable for the preparation of halftone gravure printing inks.

One group of these pyridone azo dyestuffs can be obtained by reacting pyridone azo dyestuffs having 1–4 hydroxyl groups or 1–4 carboxyl groups with dihydroxy or polyhydroxy compounds or with dicarboxylic or polycarboxylic acids with the formation of an ester-like linkage between at least two identical or different pyridone azo dyestuffs.

The pyridone azo dyestuffs having 1–4 hydroxyl groups preferably correspond to the formula

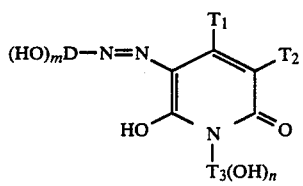

I in which

D denotes the radical of a diazo component, $T_1$ denotes alkyl, aryl or —COOT$_4$, $T_2$ denotes H, —CN, —COOT$_4$ or —CONH—T$_5$-(OH)$_n$, $T_3$ denotes aliphatic or araliphatic radicals which can be interrupted by one or more oxygen atoms, $T_4$ denotes hydrogen or alkyl, $T_5$ denotes aliphatic or araliphatic radicals which can be interrupted by one or more oxygen atoms and m and n denote 0, 1, 2, 3 or 4, subject to the proviso that the sum of m+n is 1, 2, 3 or 4.

D preferably represents a phenyl radical which can carry 1–4 substituents belonging to the series comprising optionally substituted $C_1$–$C_{12}$-alkyl, $C_2$–$C_{12}$-alkenyl, cyclohexyl, cyclopentyl, cyclohexenyl, halogen, such as Cl, Br or F, $C_1$–$C_6$-alkoxy, optionally substituted phenoxy, —CN, —CF$_3$, —NO$_2$, optionally substituted $C_1$–$C_{18}$-alkylsulphonyl, optionally substituted phenylsulphonyl, optionally substituted benzylsulphonyl, optionally substituted phenoxysulphonyl, optionally substituted carbamoyl and optionally substituted sulphamoyl.

The alkyl radicals in $C_1$–$C_{12}$-alkyl and $C_1$–$C_{18}$-alkylsulphonyl can be substituted, for example, by —OH, $C_1$–$C_6$alkoxy or —CN. The phenyl radicals in phenoxy, phenylsulphonyl, phenoxysulphonyl and benzylsulphonyl can be substituted, for example, by $C_1$–$C_4$-alkyl or halogen, such as Cl and Br.

The carbamoyl groups preferably carry two identical or different substituents belonging to the series comprising $C_1$–$C_{18}$-alkyl which can be substituted, for example, by —OH, $C_2$–$C_{18}$-alkenyl, aryloxyalkyl, $C_9$–$C_{11}$-aralkoxyalkyl, $C_7$–$C_{11}$-aralkyl, $C_4$–$C_{13}$-acyloxyalkyl, $C_6$–$C_{14}$-alkoxycarbonyloxyalkyl, $C_6$–$C_{12}$-alkylaminocarbonyloxyalkyl and $C_4$–$C_9$-dialkylaminoalkyl; corresponding diazo components are disclosed in DE-A No. 13,111,648.

The sulphamoyl groups preferably carry one or two substituents belonging to the series comprising $C_1$–$C_{18}$-alkyl or $C_1$–$C_{12}$-alkyl or $C_7$–$C_{11}$-aralkyl each of which optionally interrupted by 0 and optionally substituted by hydroxyl or phenoxy; corresponding diazo components are disclosed in EP-A No. 118,567.

The following may be mentioned as examples of diazo components:

aniline, o-, m- and p-toluidine, o-ethylaniline, p-ethylaniline, 2,3-dimethylaniline, 3,4-dimethylaniline, 2,4-dimethylaniline, 2,5-dimethylaniline, o-isopropylaniline, p-isopropylaniline, 2,4,5-trimethylaniline, 2,3,5-trimethylaniline, 2-methyl-5-isopropylaniline, 4-tert.-butylaniline, 4-sec.-butylaniline, aniline which is substituted in the o-position or p-position by linear or branched $C_{12}H_{25}$-alkyl, 4-cyclohexylaniline, 4-cyclohexyl-2-methylaniline, 4-(1-cyclohexene-1-yl)-aniline, o-, m- and p-chloroaniline, 2,3-, 2,4-, 2,5-and 3,4-dichloroaniline, 5-chloro-2-methylaniline, 4-chloro-2-methylaniline, 3-chloro-2-methylaniline, 2-chloro-5-methylaniline, 4-chloro-3-methylaniline, 3-chloro-4-methylaniline, 2-chloro-3,4-dimethylaniline, 5-chloro-2,4-dimethylaniline, 4-chloro-2,5-dimethyl-aniline, o-, m- and p-nitroaniline, 2-chloro-4-nitro-aniline, 2-nitro-4-chloroaniline, 2-methyl-4-nitroaniline, 4-methyl-2-nitroaniline, 2,4-dimethyl-5-nitroaniline, 2,5-dimethyl-4-nitroaniline, 4-isopropyl-2-nitroaniline, 4-tert.-butyl-2-nitroaniline, 4-cyclohexyl-2-nitroaniline, o-, m- and p-methoxyaniline, 2-ethoxy- and 4-ethoxyaniline, 2-phenoxyaniline, 2-(2-methyl-phenoxy)aniline, 5-chloro-2-methoxyaniline, 5-chloro-2-phenoxyaniline, 5-chloro- 2-(4-chlorophenoxy)-aniline, 4,5-dichloro-2-methoxyaniline, 2-methoxy-5-nitroaniline, 2-methoxy-4-nitroaniline, 3-chloro-4-methoxyaniline, 4-methoxy-2-nitroaniline, 4-ethoxy-2-nitroaniline, 4-ethoxy-3-nitroaniline, 3-methoxy-4-methylaniline, 4-methoxy-2-methylaniline, 2-methoxy-5-methylaniline, 2-ethoxy-5methylaniline, 4-chloro-2-methoxy-5-methylaniline, 4-chloro-2,5-dimethoxyaniline, 2,5-dimethoxy-4-nitroaniline, 2-(phenylsulphonyl)-aniline, 2-(methylsulphonyl)-4-nitroaniline, 2-methoxy-5-(phenylsulphonyl)-aniline, 5-(benzylsulphonyl)-2-methoxyaniline, 5-(ethylsulphonyl)-2-methoxyaniline,

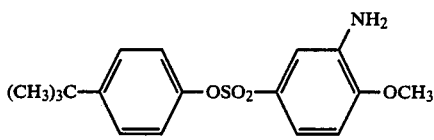

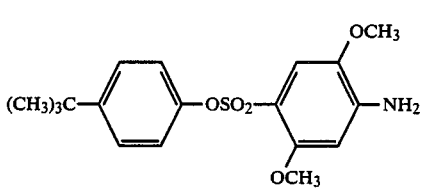

In the event that m in formula I is >0, that is to say the diazo component has 1-4 hydroxyl groups, D preferably represents a phenyl radical which can be substituted by hydroxy-$C_1$-$C_{18}$-alkoxy, —$NO_2$, —CN, F, Cl, Br or $C_1$-$C_4$-alkyl or is substituted by a radical of the formulae

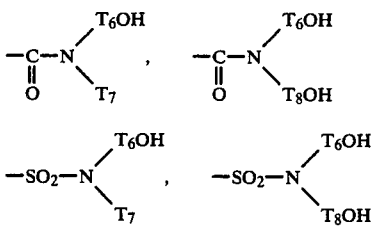

wherein
$T_6$ and $T_8$ denote an aliphatic radical which can be interrupted by one or more oxygen atoms and
$T_7$ denotes hydrogen or an aliphatic or araliphatic radical which can be interrupted by one or more oxygen atoms; and the phenyl radical D can contain 1-3, preferably 1 or 2, further substituents from the series mentioned above.

Alkyl ($T_1$ and $T_4$) preferably denotes $C_1$-$C_6$-alkyl, in particular methyl and ethyl. Aryl ($T_1$) preferably represents phenyl or naphthyl. If n is 0, $T_3$ and $T_5$ preferably represent $C_1$-$C_{22}$-alkyl, $C_2$-$C_{22}$-alkenyl, $C_3$-$C_7$-cycloalkyl, benzyl, phenethyl, $C_2$-$C_{18}$-alkoxyalkyl, phenoxy-$C_1$-$C_{22}$-alkyl or phenoxy-$C_2$-$C_{18}$-of suitable radicals $T_3$ or $T_5$ are alkoxyalkyl. Examples of suitable radicals $T_3$ or $T_5$ are methyl, ethyl, n-propyl, isopropyl, allyl, n-butyl, isobutyl, n-pentyl, isopentyl, —$CH_2C(CH_3)_3$, n-hexyl, cyclohexyl, n-octyl, 2-ethyl-hexyl, decyl, dodecyl, palmityl, stearyl or oleyl; or —$CH_2CH_2OCH_3$, —$CH_2CH_2OC_2H_5$, —$CH_2CH_2CH_2O(CH_2)_3CH_3$,

—CH$_2$CH$_2$CH$_2$OCH$_2$CH(CH$_2$)$_3$CH$_3$,
|
C$_2$H$_5$

-continued

—$CH_2CH_2CH_2O(CH_2)_{11}CH_3$, —$CH_2CH_2OCH_2CH_2OCH_3$,

—$CH_2CH_2CH_2OCH_2CH_2O(CH_2)_3CH_3$,

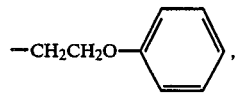

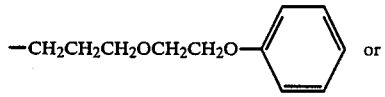

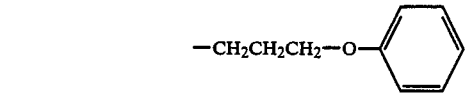

If n is >0, $T_3$ and $T_5$ preferably represent a $C_2$-$C_{18}$ alkyl radical which can be interrupted by 1-6 O atoms; the following are examples of corresponding hydroxyalkyl radicals:

—$CH_2CH_2OH$, —$CH_2CH_2CH_2OH$, —$CH_2CH(OH)CH_3$, —$CH_2CH(OH)CH_2CH_3$, —$CH_2CH_2CH(OH)CH_3$, —$CH_2CH_2CH_2CH_2OH$, —$CH_2CH_2OCH_2CH_2OH$, —$CH_2CH_2(OCH_2CH_2)_pOH$ (p=1-5), —$CH_2CH_2CH_2OCH_2CH_2OH$, —$CH_2CH_2CH_2(OCH_2CH_2)_qOH$ (q=1-3) —$CH_2CH_2CH_2O(CH_2)_4OH$, —$CH_2CH_2CH_2O(CH_2)_6OH$, —$CH_2CH_2CH_2OCH_2CH_2CH(CH_3)CH_2CH_2OH$, —$CH_2CH(OH)CH_2OH$,

—CH—CH$_2$OH, —C(CH$_2$OH)$_2$.
|                        |
CH$_3$                 CH$_3$

The pyridone azo dyestuffs having 1-4 carboxyl groups preferably correspond to the formula

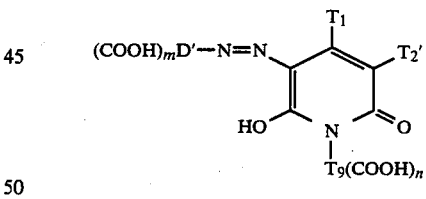

II in which
m, n and $T_1$ have the meanings indicated for formula I,
$T_2'$ denotes H, —CN or —$COOT_4$ in which $T_4$ has the meaning indicated for formula I,
$T_9$ denotes an aliphatic or araliphatic radical which can be interrupted by one or more oxygen atoms and
D' denotes the radical of a diazo component.

In the event that n=0, $T_9$ preferably represents $C_1$-$C_{22}$-alkyl, $C_2$-$C_{22}$-alkenyl, $C_3$-$C_7$-cycloalkyl, benzyl, phenethyl, $C_2$-$C_{18}$-alkoxyalkyl, phenoxy-$C_1$-$C_{22}$-alkyl or phenoxy-$C_2$-$C_{18}$-alkoxyalkyl.

Examples of suitable radicals $T_9$ are methyl, ethyl, n-propyl, isopropyl, allyl, n-butyl, isobutyl, n-pentyl, isopentyl, —$CH_2C(CH_3)_3$, n-hexyl, cyclohexyl, n-octyl, 2-ethylhexyl, decyl, dodecyl, palmityl, stearyl, oleyl,

—CH₂CH₂OCH₃, —CH₂CH₂OC₂H₅, —CH₂CH₂CH₂O(CH₂)₃CH₃,

—CH₂CH₂CH₂OCH₂CH(CH₂)₃CH₃, —CH₂CH₂CH₂O(CH₂)₁₁CH₃,
           |
           C₂H₅

—CH₂CH₂OCH₂CH₂OCH₃,
—CH₂CH₂CH₂OCH₂CH₂O(CH₂)₃CH₃,

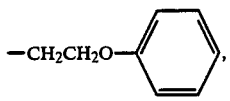

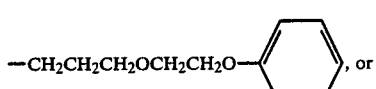, or

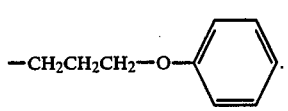.

In the event that n is >0, $T_9$ preferably represents a $C_1$–$C_{12}$-alkyl radical. The following are examples of corresponding radicals —$T_9$(COOH)$_n$: —CH₂COOH, —CH₂CH₂COOH, —CH(CH₃)COOH, —(CH₂)₅COOH, —(CH₂)₁₀COOH, —(CH₂)₁₁—COOH, HOOCCH₂—CHCOOH.

D′ preferably has the meanings mentioned for D. In the event that m in formula II is >0, that is to say the diazo component has 1–4 carboxyl groups, these carboxyl groups can be attached to the phenyl ring directly or via intermediate members.

The following are examples of diazo components having a directly attached carboxyl group: 2-, 3- or 4-aminobenzoic acid, 4-chloro-, 4-methoxy- or 4-methyl-3-aminobenzoic acid, 3-aminophthalic or 4-aminophthalic acid, 5-aminoisophthalic acid and 2-aminoterephthalic acid.

Examples of suitable intermediate members are $C_1$–$C_6$-alkylidene or —O—($C_1$–$C_6$-alkylidene) groups; the following are examples of corresponding diazo components: 2-, 3- or 4-aminophenoxyacetic acid, 2-, 3- or 4-aminophenoxypropionic acid, 2-, 3- or 4-aminophenylacetic acid and the derivatives of the acids mentioned which are substituted by one or two substituents belonging to the series comprising $C_1$–$C_4$-alkyl, halogen, such as Cl, Br or F, —CN or —NO₂.

Dicarboxylic or polycarboxylic acids which are preferentially suitable for the reaction with the dyestuffs of the formula I are oxalic acid or carboxylic acids of the formula $$[G']—(COOH)_a \qquad\qquad III$$

in which
    G′ denotes an aliphatic or aromatic hydrocarbon radical having 1–51 C atoms and
    a denotes 2, 3 or 4,
and also carboxylic acids of the formula $$[G'']—(OCH_2CH_2—COOH)_{a'} \qquad\qquad IV$$

in which
    G″ denotes a hydrocarbon radical which is preferably saturated and has two to 20 C atoms and in which the C chain can be interrupted by 1–9 non-adjacent O atoms, and
    a′ denotes 2, 3, 4 or 5.

The compounds of the formula IV can be obtained, for example, by an addition reaction between acrylonitrile and diols or polyols and subsequent hydrolysis.

The following are examples of carboxylic acids of the formula III: maleic acid, fumaric acid, itaconic acid, succinic acid, adipic acid and, preferably, higher dicarboxylic acids, such as suberic acid, azelaic acid, sebacic acid, dodecanedioic acid, dodecenylsuccinic acid, 1,4-cyclohexanedicarboxylic acid, phthalic acid, isophthalic acid, terephthalic acid, hexahydrophthalic acid, tetrahydrophthalic acid, 4-methylhexahydrophthalic acid, trimesic acid and pyromellitic acid.

The following are examples of carboxylic acids of the formula IV:

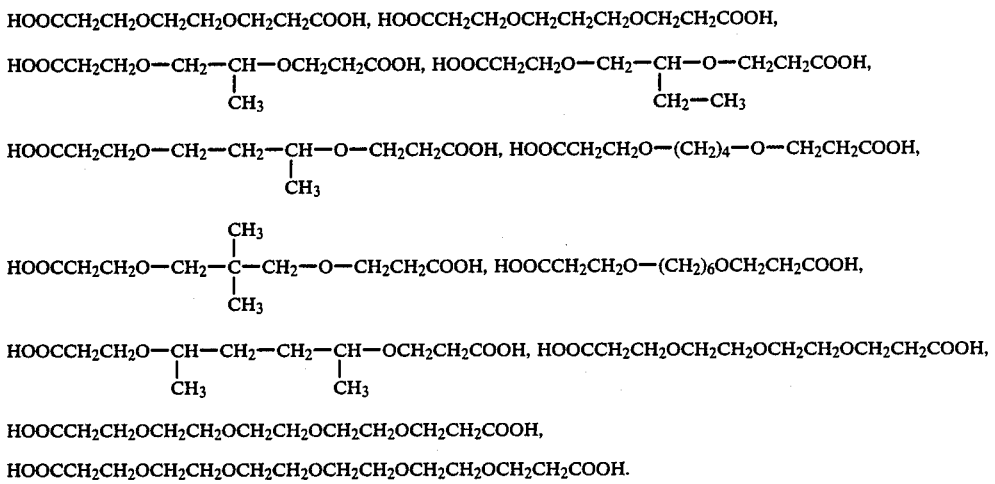

It is very particularly preferable to employ the dimeric or trimeric acids which can be prepared by oligomerization of fatty acids for the reaction with the dyestuffs of the formula I.

Dihydroxy or polyhydroxy compounds which are preferentially suitable for the reaction with the dyestuffs of the formula II correspond to the formula $$[G_1']—(OH)_{a1} \qquad\qquad V$$

in which
G₁' denotes an aliphatic hydrocarbon radical having 2-54 C atoms and
a₁ denotes 2, 3, 4 or 5.

The following are examples of compounds of the formula V:

1,2-, 1,3- and 1,4-butanediol, neopentylglycol, 1,6-hexanediol, 2,5-hexanediol, 3-methyl-1,5-pentanediol, 2-methyl-2-propyl-1,3-propanediol, octanediols (for example technical mixtures), trimethyl-1,6-hexanediol (for example mixtures), 1,12-octadecanediol, glycerol, 1,1,1-trimethylolethane, 1,1,1-trimethylolpropane, ethylene glycol, propylene glycol, 1,4-cyclohexanediol, 1,4-cyclohexanedimethanol, 2,2-bis-(4-hydroxycyclohexyl)-propane and bis-hydroxymethyltricyclopecane ("TCD-diol").

The reaction products of the compounds of the formula V with ethylene oxide or propylene oxide can also be employed.

Other preferred hydroxy compounds are diglycols or polyglycols having 3-20 ethylene oxide units, dipropylene or polypropylene glycols having 3-20 propylene oxide units and copolymers formed from ethylene oxide and propylene oxide and also 1,4-bis-(2-hydroxyethoxy)-benzene, 4,4'-bis-(2-hydroxyethoxy)-diphenyl sulphone, 2,2-bis-[4(2-hydroxyethoxy)-phenyl]-propane and 1,5-, 2,6-, 2,7- and 1,7-bis-(2-hydroxyethoxy)-napthaline.

If pyridone azo dyestuffs of the formula I containing hydroxyl groups are esterified, it is additionally possible to add dihydroxy or polyhydroxy compounds, for example of the type described above, and it is appropriate to increase the amount of dicarboxylic or polycarboxylic acid to an equivalent extent. A process of this type results in a lengthening of the chain, by means of which it is possible to improve technical properties of the products in use, for example solubility and strikethrough behaviour.

An analogous procedure can be followed when pyridoneazo dyestuffs of the formula II containing carboxyl groups are esterified with dihydroxy or polyhydroxy compounds, dicarboxylic or polycarboxylic acids of the type described above being added.

If excess carboxyl groups or aliphatic hydroxyl groups are present in the pyridone azo dyestuffs which are already linked, these groups can also be esterified with the diols or polyols or dicarboxylic or polycarboxylic acids mentioned in the preceding paragraphs, as a result of which the pyridone azo dyestuffs optionally receive further linkages. It is also possible for excess carboxyl or hydroxyl groups of the pyridone azo dyestuffs which already contain an ester-like linkage to be esterified further by monofunctional alcohols or monofunctional carboxylic acids, such as saturated or unsaturated $C_{10}$-$C_{22}$-fatty alcohols, $C_{10}$-$C_{22}$-fatty acids or reaction products of fatty alcohols with ethylene oxide or propylene oxide, such as are also used, for example, as emulsifiers and dispersing agents.

In all the esterification reactions mentioned, it is also possible to add compounds containing both a carboxyl group and an aliphatic hydroxyl group. Although these do not result in a linkage, they lengthen the chain and can thus, for example, improve the solubility. The examples of hydroxycarboxylic acids of this type are glycollic acid, lactic acid, 3-hydroxypropanoic acid, 6-hydroxycaproic acid, ricinoleic acid, hydroxystearic acid, 4-(2-hydroxyethoxy)-benzoic acid or, if appropriate, the lactones, oligomers or polymers of these compounds.

The esterification reactions mentioned can, of course, also be carried out before the coupling with the individual components.

In the esterification reactions, the components containing hydroxyl and carboxyl groups to be esterified can, in the simplest case, be employed in equivalent amounts. It is also possible, however, to employ one or more of the components in excess. This can be advantageous for several reasons:

Thus, for example, it is possible by this means to accelerate the esterification. Under certain circumstances, it is also possible to arrange for the esterification to take place as quantitatively as possible in terms of one of the components. This is particularly important, for example, if the pyridone azo dyestuffs employed, containing hydroxyl or carboxyl groups, are themselves even more sparingly soluble and are only converted into compounds of improved solubility as a result of esterification. The components employed in excess can also cause chain termination and thus limit the molecular weight of the compounds. This can be important if compounds having a fairly high molecular weight and hence, perhaps, an excessively high viscosity are formed in the esterification of equivalent amounts of components containing carboxyl or hydroxyl groups.

The esterification itself can be carried out in a customary manner, such as is described, for example, in Houben-Weyl, Methoden der organischen Chemie ("Methods of Organic Chemistry") 4th Edition, Volume VIII, pages 516 et seq., Georg Thieme Verlag, Stuttgart 1952.

Thus, for example, the components can be heated in a suitable solvent in the presence of an acid catalyst, and the water formed thereby can be removed azeotropically. The following are examples of acid catalysts: sulphuric acid, hydrochloric acid, chlorosulphonic acid, phosphoric acid, methanesulphonic, ethanesulphonic and butanesulphonic acids, benzenesulphonic, toluenesulphonic and dodecylbenzenesulphonic acids and naphthalene-1-sulphonic and naphthalene-2-sulphonic acids and acid exchangers.

The esters can also be prepared by transesterification. In this case the starting materials are esters, with lower fatty acids and lower alcohols, of the components containing hydroxyl and carboxyl groups, and transesterification is carried out in a known manner in the presence of a catalyst, the lower fatty acids and alcohols being removed simultaneously from the equilibrium by being distilled off.

It is also possible to prepare the esters starting from activated derivatives of the carboxylic acids, for example starting from carboxylic acid chlorides and anhydrides. Derivatives which are particularly suitable for this purpose are cyclic anhydrides, such as, for example, maleic anhydride, succinic anhydride, glutaric anhydride, phthalic anhydride, hexahydrophthalic anhydride, 4-methylhexahydrophthalic anhydride, tetrahydrophthalic anhydride and dodecenylsuccinic anhydride. The use of these anhydrides is advantageous above all when the starting material is a sparingly soluble pyridone azo dyestuff containing hydroxyl groups. The pyridone azo dyestuff can first be reacted with one of the anhydrides mentioned, with the formation, as a rule, of products of improved solubility which can be esterified further more readily.

Further linked pyridone azo dyestuffs which can be used in accordance with the invention correspond, in one of their tautomeric forms, to the formula

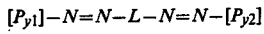  VI in which

[P$_{y1}$] and [P$_{y2}$] denote pyridone radicals which, in one of their tautomeric forms, correspond to the formulae

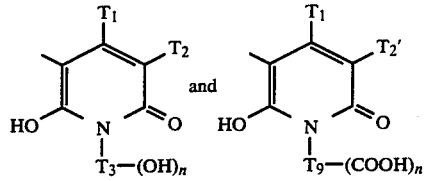

in which

T$_1$, T$_2$, T$_3$, T$_2'$, T$_9$ and n have the meanings indicated for the formulae I and II and L represents an optionally substituted phenylene radical, such as m-phenylene or p-phenylene, or a radical of the formula

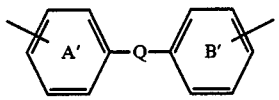

wherein the rings A' and B' can optionally be substituted and Q denotes $-O-$, $-S-$, $-SO_2-$, $-\underset{\underset{O}{\|}}{C}-$, $-CH_2-$, $-CH_2CH_2-$,

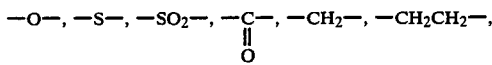

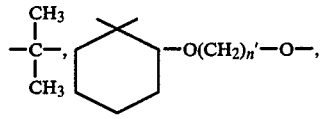

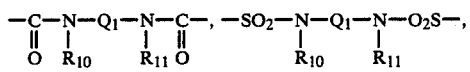

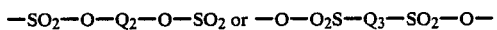

wherein R$_{10}$ and R$_{11}$ denote hydrogen or C$_1$–C$_6$-alkyl or C$_3$–C$_7$-cycloalkyl each of which can be substituted, for example, by —OH or —CN, and R$_{10}$ and R$_{11}$ can also come together and form a —(CH$_2$)$_{1-4}$ bridge, Q$_1$ denotes an optionally substituted hydrocarbon radical in which the C chain can be interrupted by one or more non-adjacent O atoms or

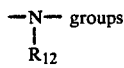 groups wherein R$_{12}$ denotes hydrogen or C$_1$–C$_4$-alkyl which can be substituted, for example, by —OH, this radical being preferably derived from a C$_2$–C$_{20}$-alkane, a C$_3$–C$_7$-cycloalkane, preferably cyclohexane, a phenyl -C$_1$–C$_6$-alkane or a naphthyl -C$_1$–C$_6$-alkane, benzene or naphthalene, Q$_2$ and Q$_3$ denote aromatic radicals and n' denotes 1, 2, 3, 4, 5 or 6.

In preferred radicals

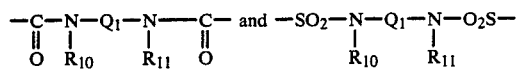

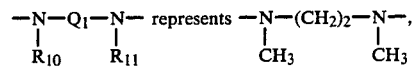

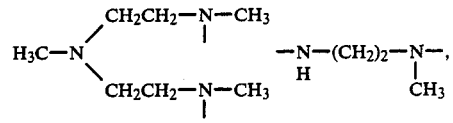

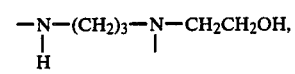

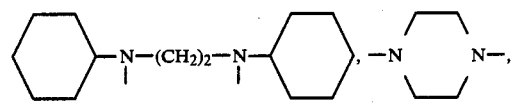

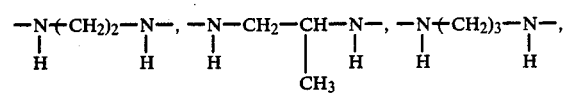

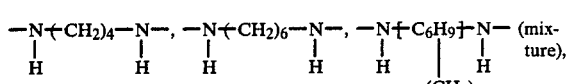

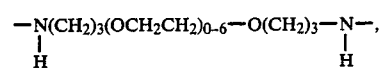

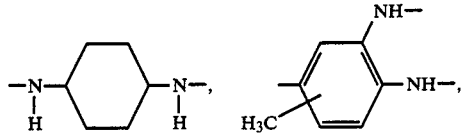

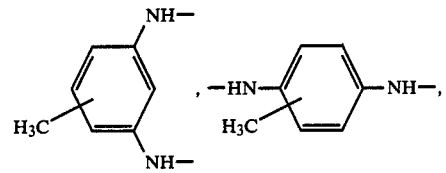

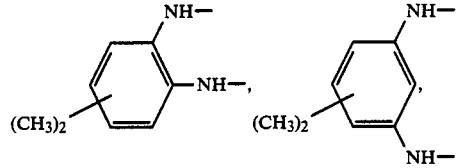

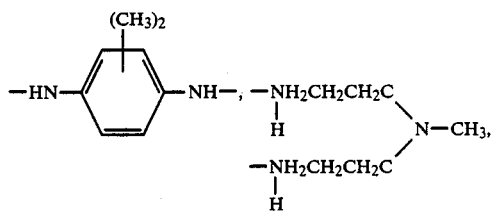

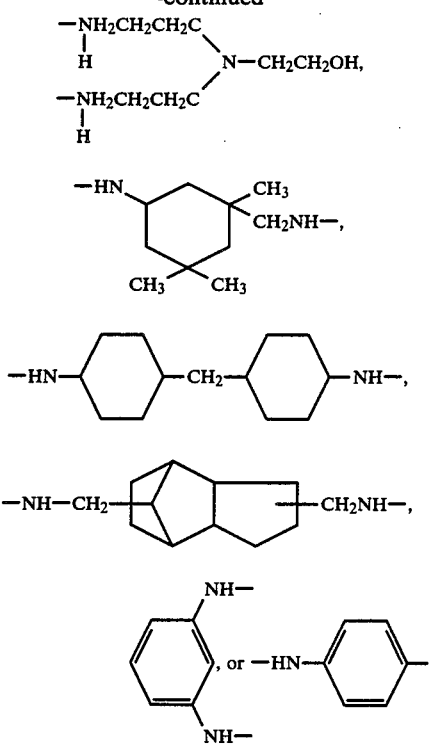

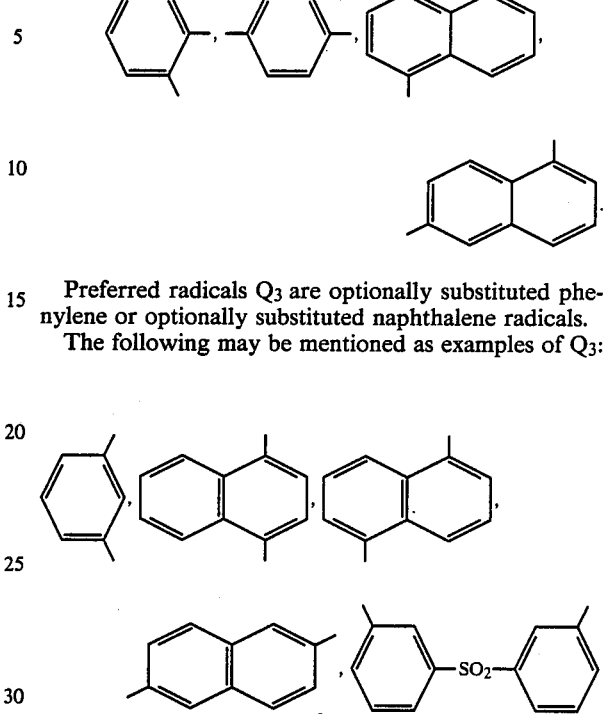

Preferred radicals $Q_2$ are optionally substituted phenylene, optionally substituted naphthalene or optionally substituted radicals of the formulae Preferred radicals $Q_3$ are optionally substituted phenylene or optionally substituted naphthalene radicals.

The following may be mentioned as examples of $Q_3$:

Another preferred group of compounds which can be employed in accordance with the invention corresponds to the formula

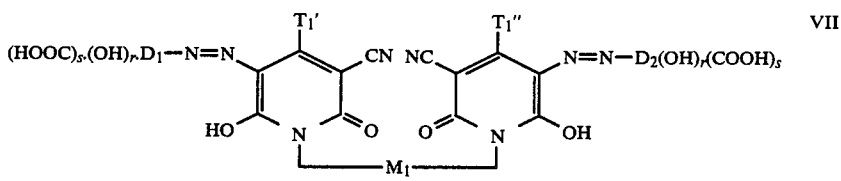

VII

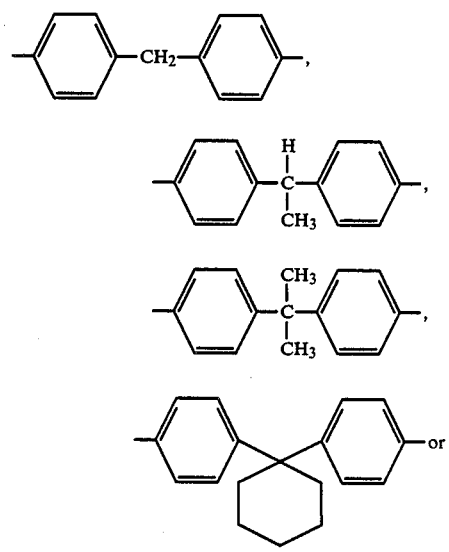

in which
$D_1$ and $D_2$ denote the radical of a diazo component,
$T_1'$ and $T_1''$ denote alkyl, arkl or —$COOT_4'$,
$T_4'$ denotes hydrogen or alkyl,
$M_1$ denotes the radical of an optionally substituted hydrocarbon in which the C chain can be interrupted by one or more non-adjacent O atoms or $$-\underset{R_{13}}{\underset{|}{N}}- \text{ groups,}$$

$R_{13}$ denotes hydrogen or $C_1$-$C_4$-alkyl which can be substituted, for example, by —OH, and
r, r', s and s' denote 0, 1 or 2.

Preferred meanings of $D_1$ and $D_2$ correspond to the preferred meanings of D indicated above.

The following may also be mentioned as preferred diazo components: diazo components containing a group $H_2N-X_1-$, such as

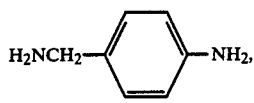

or diazo components containing a sulphamoyl or carbamoyl substituent, such as

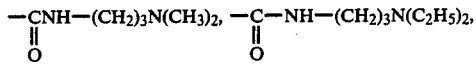

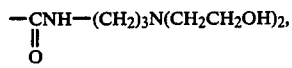

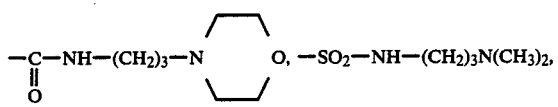

—SO$_2$—NH—(CH$_2$)$_3$N(C$_2$H$_5$)$_2$, or

—SO$_2$—NH—(CH$_2$)$_3$N(CH$_2$CH$_2$OH)$_2$,

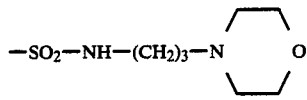

Provided that they contain free —OH or —COOH groups, the pyridone azo dyestuffs of the formula VI and VII can be esterified with diols or polyols or dicarboxylic or polycarboxylic acids, whereby it is possible to increase the degree of linkage and to improve the solubility.

In principle, the esterification can be carried out like the esterification, already described above, of the compounds of the formulae I and II.

In particular, since they are already linked, the dyestuffs of the formulae VI and VII can also be esterified by monofunctional alcohols or monofunctional carboxylic acids, such as saturated or unsaturated C$_{10}$–C$_{22}$-fatty alcohols, C$_{10}$–C$_{22}$-fatty acids or reaction products of fatty alcohols with ethylene oxide or propylene oxide.

Another preferred group of dyestuffs which can be employed in accordance with the invention corresponds to the formula

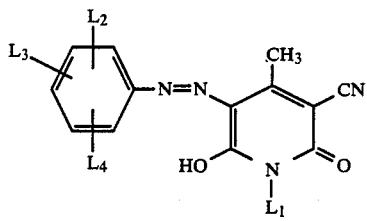

VIII in which

L$_1$ denotes optionally substituted C$_{12}$–C$_{22}$-alkyl, optionally substituted C$_{12}$–C$_{22}$-alkenyl,

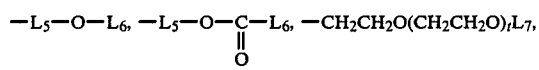

-continued

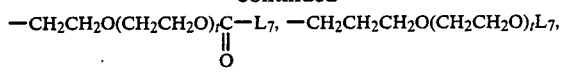

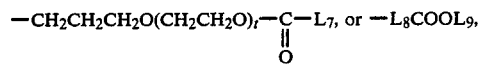

L$_5$ denotes C$_2$–C$_{12}$-alkylene,

L$_6$ denotes C$_2$–C$_{22}$-alkyl or C$_2$–C$_{22}$-alkenyl,

L$_7$ denotes hydrogen, C$_1$–C$_{22}$-alkenyl or optionally substituted phenyl, L$_8$ denotes C$_1$–C$_{12}$-alkylene, L$_7'$ denotes C$_1$–C$_{22}$-alkyl, C$_2$–C$_{22}$-alkenyl or optionally substituted phenyl, L$_9$ denotes hydrogen, C$_1$–C$_{22}$-alkyl or C$_2$–C$_{22}$-alkenyl, t denotes 0, 1, 2, 3, 4 or 5, L$_2$ denotes hydrogen, halogen, such as F, Cl or Br, C$_1$–C$_{22}$-alkyl, cyclopentyl, cyclohexyl, cyclopentenyl, cyclohexenyl, aralkyl, in particular phenyl-C$_1$–C$_4$-alkyl and naphthyl-C$_1$–C$_4$-alkyl, —CF$_3$, —NO$_2$, —CN, C$_1$–C$_4$-alkoxy, C$_1$–C$_4$-alkoxycarbonyl, mono-C$_1$–C$_8$-alkylcarbamoyl, di-C$_1$–C$_8$-alkylcarbamoyl, mono-C$_1$–C$_8$-alkylsulphamoyl and di-C$_1$–C$_8$-alkylsulphamoyl, L$_3$ denotes hydrogen, halogen, such as F, Cl or Br, —CN, C$_1$–C$_4$-alkyl, C$_1$–C$_4$-alkoxy or C$_1$–C$_4$-alkoxycarbonyl and L$_4$ denotes hydrogen and C$_1$–C$_4$-alkyl.

The C$_{12}$–C$_{22}$-alkyl and C$_{12}$–C$_{22}$-alkenyl radicals L$_1$ can be substituted, for example, by —OH or C$_1$–C$_{22}$-alkoxy or C$_3$–C$_{22}$-alkenyloxy.

L$_1$ in formula VIII preferably contains at least 12, particularly preferably at least 18, C atoms.

The dyestuffs of the formula VIII are known or can be prepared analogously to processes known from the literature, (see, for example, German Offenlegungsschrift Nos. 2,216,207, 3,111,648 and 3,012,863).

One valuable property of the dyestuffs of the formula VIII is that the colour shades are generally within the range desired for three-colour or four-colour printing.

The invention also relates to new dyestuffs which can be obtained by reacting dyestuffs of the formula I with dicarboxylic or polycarboxylic acids with the formation of an ester-like linkage between at least two identical or different dyestuffs of the formula I.

The invention also relates to new dyestuffs which can be obtained by reacting dyestuffs of the formula II with dihydroxy or polyhydroxy compounds with the formation of an ester-like linkage between at least two identical or different dyestuffs of the formula II.

The invention also relates to new dyestuffs of the formula

[P$_{y1}$]—N=N—L'—N=N—[P$_{y2}$]   IX in which

[P$_{y1}$] and [P$_{y2}$] have the meanings indicated for formula VI and

L' represents

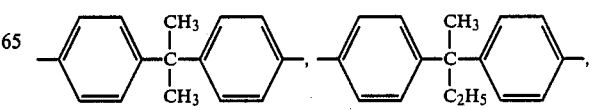

-continued

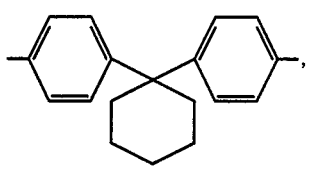

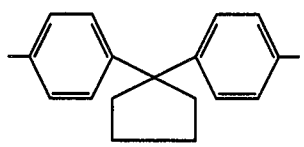

wherein the phenylene, cyclopentylene and cyclohexylene radicals can be substituted, for example, by $C_1$–$C_4$-alkyl and the phenylene radicals can also be substituted by $NO_2$ and Cl.

The preparation of the dyestuffs of the formulae I, II, VI, VII, VIII and IX is effected by, or analogously to, processes known from the literature (see, for example, German Offenlegungsschrift Nos. 2,216,207, 3,111,648, 3,012,863, 2,152,536 and U.S. Pat. No. 4,476,318).

In the event that the pyridone azo dyestuffs mentioned above also contain aliphatic amino groups, it is possible to convert the dyestuffs into salts with suitable acids in order to increase their solubility. The following are possible suitable acids: saturated or unsaturated $C_8$–$C_{22}$-fatty acids; resin acids, such as abietic acid or reaction products thereof with maleic or fumaric acid; and dimerised or trimerised fatty acids, $C_{10}$–$C_{20}$-alkanesulphonic acids, dodecylbenzenesulphonic acids and phosphoric acid monoesters or di-esters of fatty alcohols.

Those of the pyridone azo dyestuffs mentioned above which also contain free carboxylic acid groups can also be converted analogously into salts with amines:

The following are examples of suitable amines: dicyclohexylamine, saturated or unsaturated $C_{10}$–$C_{22}$-fatty alkylamines or di-fatty alkylamines, fatty alkylpropylenediamines, abietylamines or the reaction products of these amines with alkylene oxides, for example ethylene oxide and propylene oxide.

It is preferable to use, in the preparation of halftone gravure printing inks, compounds of the formulae I, II, VI, VII, VIII and IX or esterification products thereof in which the proportion by weight in the dyestuff molecule of hydrocarbon radicals not directly attached to the azo group is at least 20%, preferably at least 25% and particularly preferably at least 30%.

The calculation leading to the selection of these compounds will be illustrated by means of two examples:

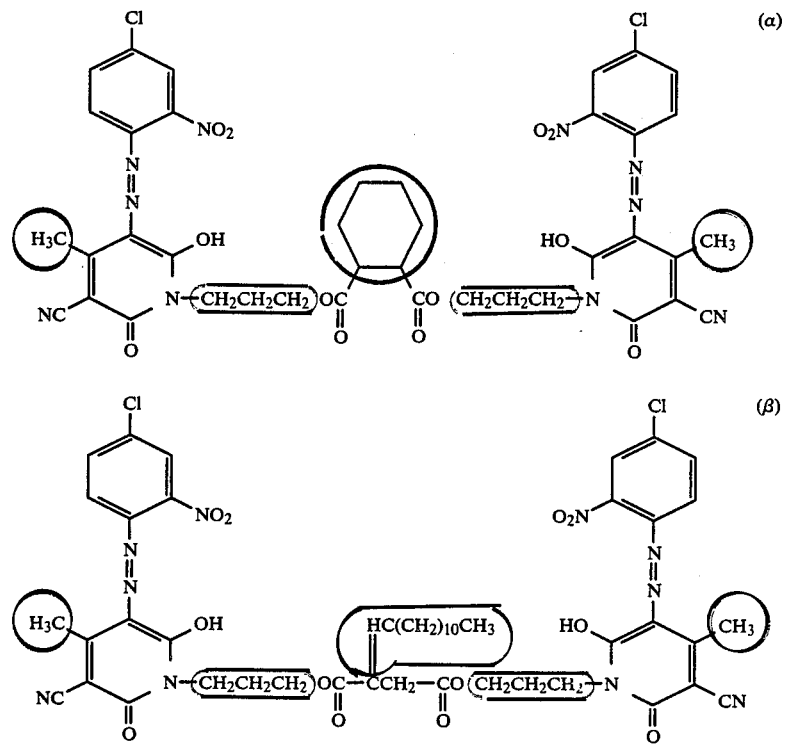

In the formulae $\alpha$ and $\beta$ the hydrocarbon radicals not directly attached to the azo group have been marked.

In formula $\alpha$ the proportion by weight of these substituents in the total weight of the molecule is 21.4%, and in formula $\beta$ it is 32.2%.

The halftone gravure printing inks prepared using the pyridone azo dyestuffs preferably contain, relative to the weight of the components (A), (B) and (C):

(A) about 2 to about 20% by weight of colourant,
(B) about 10 to about 40% by weight of resin and
(C) about 80 to about 50% by weight of solvent, and, if appropriate, further additives.

The colourant can also be a mixture of several of the pyridone azo dyestuffs mentioned above, a mixture of at least one of these pyridone azo dyestuffs with another dyestuff suitable for halftone gravure printing and, in particular, also a mixture of at least one of the pyridone azo dyestuffs mentioned above and at least one pigment suitable for halftone gravure printing inks. The last-mentioned mixtures can contain up to 90% by weight, preferably up to 50% by weight, of pigment. Mixtures of the pyridone azo dyestuffs with one another are often obtained merely by employing, in the preparation, natural products or components prepared from natural products, which are in the form of mixtures in accordance with the invention, or components which are in the form of a mixture of stereoisomers. However, it is also possible to increase the proportion in the mixture by mixing finished products or by employing mixtures of components in the preparation, for example mixtures of pyridone azo dyestuffs such as are formed by mixed coupling reactions. These mixtures have the advantage that they are often more readily soluble than the pure components.

Pigments suitable for the preparation of mixtures of the pyridone azo dyestuffs mentioned with pigments are preferably yellow pigments, for example CI pigment yellow 12, 13, 14, 17, 74 and 83. In addition, mixtures with pigments having a different colour shade are also suitable for the production of special shades, for example CI pigment orange 5 and 34; CI pigment red 2, 53, 57; 1, 112, 122, 146 and 148; CI pigment violet 19; CI pigment blue 15 and 27; CI pigment green 7 and 36 and CI pigment black 7. The pyridone azo dyestuffs can also be used for shading the pigments mentioned.

Examples of suitable resins are calcium resinates, zinc resinates, phenol-modified colophony resins, chlorinated rubber, calcium salts of dimerised colophony and synthetic hydrocarbon resins.

Suitable solvents are preferably petroleum ether, in particular light petroleum ether fractions, xylene and, particularly preferably, toluene.

Thus the present invention relates preferably to the preparation of halftone gravure printing inks based on toluene.

For the preparation of halftone gravure printing inks, the pyridone azo dyestuffs, if appropriate as a mixture with pigments, are incorporated into the printing ink mixtures in a customary manner.

In the process according to the invention for the preparation of halftone gravure printing inks, finely dispersed inorganic additives having a BET specific surface area of at least 50 m$^2$/g, preferably at least 100 m$^2$/g and particularly preferably at least 200 m$^2$/g, can, with advantage, be added to the pyridone azo dyestuff.

Aluminium hydroxides in particular, and, very particularly, silica have proved suitable as additives.

The additives are preferably employed in amounts of 0.2–2% by weight, particularly preferably 0.4–0.9% by weight, relative to the weight of printing ink.

As a result of these additives it is possible to reduce further the tendency of the dyestuffs to strike through, whereby results are achieved such as can otherwise only be achieved when using pigments alone.

The finely disperse silicas which are preferably employed are finely divided silicas which are predominantly amorphous and crosslinked to a varying extent and have the specific surface areas mentioned above. Examples of silicas of this type are known from Ullmanns Encyklopadie der technischen Chemie ("Ullmann's Encyclopedia of Industrial Chemistry"), 4th Edition, Volume 21, pages 451–476.

The silicas can be obtained, for example, by precipitation from solutions or by pyrogenic processes; as well as a predominance of silica, they can also contain other metal oxides and hydroxides, for example oxides and hydroxides of aluminium and titanium.

It is necessary to disperse the silicas in the gravure printing ink. This dispersion can be carried out in the finished gravure printing ink or in a concentrate. However, it is also possible first to prepare a dispersion in the solvent used for the gravure printing ink, if appropriate also in a higher concentration, and it is possible to add a part or all of the resin at this stage. The following are examples of suitable dispersing units: stirrers, high-speed stirrers, dissolvers, bead mills and ball mills or a combination of these units.

In addition to the silicas, it can also be advantageous to add wetting agents and dispersing agents for these silicas. Particularly suitable dispersing agents are the salts of strong organophilic acids with aliphatic amines and polyamines optionally containing hydroxyl groups.

The following are examples of strong organophilic acids: $C_{10}$-$C_{20}$-alkanesulphonic acids, alkylarylsulphonic acids, such as dodecylbenzenesulphonic acid or ditert.-butylnaphthalenesulphonic acids, and sulphuric acid monoesters or phosphoric acid monoesters or diesters of alkanols or reaction products thereof with ethylene oxide or propylene oxide.

Examples of alkanols of this type are saturated or unsaturated, linear or branched $C_4$-$C_{22}$-aliphatic alcohols, such as butanol, 2-ethylhexanoL, dodecanol, tetradecyl, hexadecyl and octadecyl alcohol and oleyl alcohol and the reaction products of these alcohols with 1–20 moles of ethylene oxide or propylene oxide.

The following are examples of suitable aliphatic amines: ethylene diamine, amines of the formula $H_2N(CH_2CH_2NH)_nH$ in which n=2–6, propylene diamine, dipropylene diamine and tallow fat propylenediamine. Examples of suitable amines containing hydroxyl groups are those formed in the reaction of ammonia or $C_1$-$C_{20}$-alkyl mono-, di- or poly-amines with ethylene oxide or propylene oxide or with epichlorohydrin.

The following are examples of these: ethanolamine, diethanolamine, triethanolamine, tris-[2-(2-hydroxyethoxy)-ethyl]-amine, bis-(2-hydroxyethyl)methylamine, -ethylamine, -propylamine or -butylamine, 2-(2-aminoethylamino)-ethanol, 2-(hydroxyethyl)-bis-(2-hydroxypropyl)-amine, tris-(2-hydroxypropyl)-amine, 3-[bis-(2-hydroxyethyl)-amino]-propylamine, pentahydroxyethyldiethylenetriamine and 2,3-dihydroxypropylamine; and the reaction products of coconut oil acids, tallow fat amine, stearylamine and oleylamine with two moles of ethylene oxide or of tallow fat propylenediamine with three moles of ethylene oxide.

These dispersing agents are added in amounts between 10 and 200% by weight, preferably 50 and 100% by weight, relative to the silica.

Examples of other suitable finely dispersed additives are finely dispersed aluminium hydroxides or the aluminium hydroxide gels which are largely X-ray amorphous and can be obtained, for example, by precipitation from acid aluminium salt solutions by means of bases or by the process of flame hydrolysis.

Preferred aluminium hydroxides have a BET specific surface area of at least approximately 50 m$^2$/g They can be dispersed in the same manner and with the addition of the same dispersing agents as has been described above for the silicas. Mixtures of finely dispersed aluminium hydroxides and silicas can also be used in accordance with the invention.

The penetration and/or striking through of a printing ink can be tested by assessing, visually or colorimetrically from the reverse side, the showing through or striking through of a print or coating of the printing ink on the printed material, for example a printing paper.

Striking through is of particular importance in the case of the attractively priced qualities of paper which have a paper weight of 42 g/m² or less and are increasingly used.

In addition, the new dyestuffs according to the invention can be used for dyeing surface coatings, other organic solvents and mineral oil products, because they are distinguished by an unexpectedly high solubility in these media.

Examples of individual substrates which can be dyed by means of the new pyridone azo dyestuffs are printing inks based on esters, ketones, glycols, glycol ethers and alcohols, such as ethyl acetate, butyl acetate, methoxyethyl acetate, acetone, methyl ethyl ketone, methylglycol, methyldiglycol, butyldiglycol, ethanol, propanol, butanol, butylphthalate and ethylphthalate, or writing inks, fuel oils and diesel oils and organic solvents in general.

In particular, the new dyestuffs can also be used for the preparation of flexographic and packaging gravure printing inks, if appropriate also as a mixture with pigments.

The new dyestuffs can also be employed in the preparations described, containing a finely dispersed inorganic additive.

EXAMPLE 1

37.1 g (0.1 mol) of a dyestuff of the formula I obtained in a customary manner by diazotization and coupling:

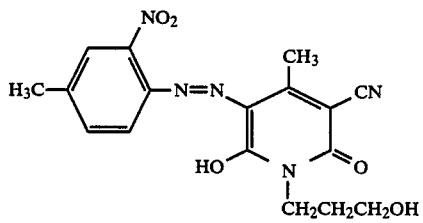

(I)

31.9 g of pripol 1010, a commercially avalable, dimerised fatty acid made by Unichema and having an acid number of approximately 195, 200 ml of toluene and 1 g of methanesulphonic acid are heated under reflux for seven hours, in the course of which the water formed in the esterification is separated off in a water separator. During the last two hours, a total of 100 ml of toluene is distilled off slowly, whereby the temperature rises to approximately 130° C. After this an unesterified dyestuff can no longer be detected in a thin-layer chromatogram. The solution is diluted with 50 ml of toluene, and a small amount of undissolved residue is filtered off with suction and rinsed with a little toluene. 230 g of a clear, yellow solution are obtained.

18 g of this solution, 51 g of a 50% strength solution in toluene of Alsynol KZ 71, a commercially available hydrocarbon resin made by Synres and 36 g of toluene are mixed. The gravure printing ink thus obtained has a viscosity corresponding to a flow time of 23 seconds in the DIN 3 cup specified in DIN 53,211. This printing ink is used to print gravure printing paper on a Durner gravure printing handproofing apparatus, very deep yellow prints being obtained.

A similar result is achieved if a printing ink consisting of 21.6 g of the dyestuff solution, 49.9 g of toluene and 28.5 g of Erkazit 899, a calcium resinate made by Lackharzwerke Robert Krämer, is employed.

EXAMPLE 2

A printing ink consisting of 18 g of the dyestuff solution according to Example 1, 50 g of a 50% strength solution of Alsynol KZ 71, 19 g of toluene and, in addition, 16 g of a 5% strength dispersion of Aerosil 380, a commercially available, finely disperse silica having a BET specific surface area of approximately 380 m²/g (manufacturer: Degussa) in toluene, is prepared analogously to Example 1. A printing ink having the same viscosity and properties similar to those of Example 1 is obtained. The strike-through behaviour is satisfactory even when printing paper having a very low weight per unit area.

Similar results are obtained if Aerosil 300 (a commercially available, finely disperse silica having a BET specific surface area of approximately 300 m²/g (manufacturer: Degussa)), Aerosil 200 (a commercially available, finely disperse silica having a BET specific surface area of approximately 200 m²/g (manufacturer: Degussa)) or HDK T 40, a finely disperse silica made by Wacker Chemie, is employed instead of Aerosil 380.

EXAMPLE 3

The procedure is as in Example 1, but 33.1 g of Pripol 1040, a commercially available, trimerised fatty acid made by Unichema, are employed instead of the dimerised fatty acid. This gives a solution containing, as the essential dissolved constituent, a pyridone azo dyestuff of the formula indicated in Example 1 which is trebly linked via the trimerised fatty acid. Printing inks prepared therefrom analogously to Examples 1 and 2 exhibit equally good properties.

EXAMPLE 4

37.1 g (0.1 mol) of a pyridone azo dyestuff of the formula indicated in Example 1, 200 ml of toluene and 50.4 g (0.3 mol) of 4-methylhexahydrophthalic anhydride are heated under reflux for one hour, in the course of which everything dissolves. 1 g of methanesulphonic acid and 32.2 g (0.24 mol) of a dipropylene glycol mixture are added and heating under reflux is continued, the water of esterification which is formed being separated off by means of a water separator. After approximately one hour sufficient toluene is distilled off for the temperature to reach approximately 130° C., and heating is continued for a further eight hours. The further procedure is as in Example 1 and affords 265 g of a solution containing a pyridone azo dyestuff of the formula indicated in Example 1 which is linked via oligomeric esters formed from 4-methylhexahydrophthalic anhydride and dipropylene glycol. In addition, oligomeric esters formed from 4-methylhexahydrophthalic acid and dipropylene glycol are probably also present. A printing ink prepared analogously to Example 1 exhibits an even better strike-through behaviour than a printing ink according to Example 1. Printing inks prepared analogously to Example 2 using finely disperse silicas produce results comparable with the printing inks according to Example 2.

Linked pyridone azo dyestuffs were prepared analogously to the processes indicated in Examples 1-4 from the pyridone azo dyestuffs of the following general formula A listed in Table 1 by esterification with the carboxylic acids, carboxylic anhydrides and alcohols indicated in Table 2, in the amounts indicated therein:

TABLE 1

![Structure A: pyridone azo dye with R1, R2, R3 on phenyl ring connected via N=N to a pyridone bearing CH3, CN, OH, =O, and N-R4]

A

| Dyestuff | $R_1$ | $R_2$ | $R_3$ | $R_4$ |
|---|---|---|---|---|
| I | $NO_2$ | $CH_3$ | H | $-CH_2CH_2CH_2OH$ |
| II | " | " | " | $-CH_2CH(OH)CH_3$ |
| III | " | " | " | $-CH_2CH_2OCH_2CH_2OH$ |
| IV | " | " | " | $-CH_2CH_2OH$ |
| V | $NO_2$ | Cl | " | $-CH_2CH_2OCH_2CH_2OH$ |
| VI | $NO_2$ | Cl | H | $-CH_2CH(OH)CH_3$ |
| VII | H | Cyclohexyl | " | $-CH_2CH_2OH$ |
| VIII | " | " | " | $-CH_2CH_2OCH_2CH_2OH$ |
| IX | " | " | " | $-CH_2CH_2CH_2OH$ |
| X | " | tert.-Butyl | " | $-CH_2CH_2OCH_2CH_2OH$ |
| XI | " | " | " | $-CH_2CH_2CH_2OH$ |
| XII | $NO_2$ | " | " | $-CH_2CH_2CH_2OH$ |
| XIII | $CH_3$ | $NO_2$ | " | $-CH_2CH_2OCH_2CH_2OH$ |
| XIV | H | ⟨C6H5⟩—$SO_2O-$ | " | $-CH_2CH_2CH_2OH$ |
| XV | $NO_2$ | $OCH_3$ | " | $-CH_2CH_2CH_2OH$ |
| XVI | $CH_3$ | $CH_3$ | $CH_3$ | $-CH_2CH_2CH_2OH$ |
| XVII | $OCH_3$ | H | $-SO_2N(CH_2CH_2OH)_2$ | $-CH_2CH(CH_2)_3CH_3$<br>$\quad\mid$<br>$\quad C_2H_5$ |
| XVIII | " | " | " | $-CH_2CH_2CH_2OH$ |
| XIX | H | $CH_3$ | Cl | $-CH_2CH_2CH_2OH$ |
| XX | H | $-OCH_2CH_2OH$ | " | $-CH_2CH_2CH_2OH$ |
| XXI | $NO_2$ | $CH_3$ | H | $-(CH_2)_5COOH$ |
| XXII | " | " | " | $-(CH_2)_{10}COOH$ |
| XXIII | " | Cl | " | $-(CH_2)_5COOH$ |
| XXIV | H | $-OCH_2COOH$ | " | $-CH_2CH(CH_2)_3CH_3$<br>$\quad\mid$<br>$\quad C_2H_5$ |
| XXV | H | $CH_3$ | " | $-CH_2CH_2OCH_2CH_2OH$ |
| XXVI | H | $CH_3$ | " | $-CH_2CH_2COOH$ |

Other esterification products of pyridone azo dyestuffs listed in Table 2 were prepared starting from pyridone azo dyestuffs of the following formulae XXVII–XXIX:

TABLE 2

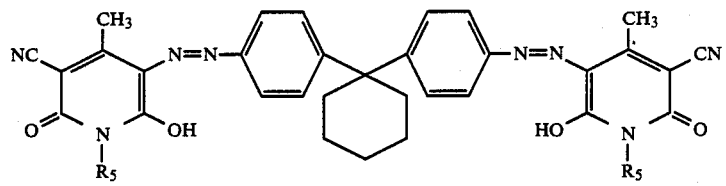

XXVII: $R_5 = (CH_2)_5COOH$
XXVIII: $R_5 = -CH_2CH_2OCH_2CH_2OH$
XXIX: $R_5 = -CH_2CH_2CH_2OH$

The amount of carboxylic acid or carboxylic anhydride employed per mol of dyestuff is indicated in column C.
The amount of alcohol employed per mole of dyestuff is indicated in column A.

| Example | Dyestuff | | Carboxylic acid or anhydride | A | Alcohol |
|---|---|---|---|---|---|
| 5 | I | 3 | 4-methylhexahydrophthalic anhydride ("MHPA") | 2.4 | 1,2-bis-(hydroxyethoxy)-ethane |
| 6 | I | 3 | phthalic anhydride | 2.4 | 1,6-hexanediol |
| 7 | I | 3 | " | 2.4 | polyglycol P 400 |

TABLE 2-continued

| | | | | | |
|---|---|---|---|---|---|
| 8 | I | 2 | dodecanedioic acid | 1.2 | bis-hydroxymethyltricyclodecane ("TCD-diol") |
| 9 | II | 2 | " | 1.4 | " |
| 10 | II | 3 | MHPA | 2.4 | 1,6-hexanediol |
| 11 | III | 3 | " | 2.4 | 1,2-bis-(hydroxyethoxy)-ethane |
| 12 | III | 1.1 | erucic acid | — | — |
| 13 | III | 3 | MHPA | 2.4 | 1,6-hexanediol |
| 14 | III | 0.55 | Pripol 1010 | — | — |
| 15 | III | 3 | MHPA | 2 | dipropylene glycol (mixture) |
| 16 | III | 3 | " | 2.2 | " |
| 17 | III | 3 | " | 2.4 | " |
| 18 | III | 2 | dodecenylsuccinic anhydride (fibran) | 1.2 | 1,12-octadecanediol |
| 19 | III | 2 | " | 1.4 | " |
| 20 | III | 2 | dodecanedioic acid | 1.4 | TCD-diol |
| 21 | III | 1.5 | fibran | — | — |
| 22 | IV | 1.5 | phthalic anhydride | 1.2 | 1,6-hexanediol |
| | | 1.5 | MHPA | 1.2 | polyglycol P 400 |
| 23 | V | 1.1 | erucic acid | — | — |
| 24 | V | 0.33 | Pripol 1040 | — | — |
| 25 | V | 0.55 | Pripol 1010 | — | — |
| 26 | VI | 2 | dodecanedioic acid | 1.1 | TCD-diol |
| 27 | VII | 0.55 | Pripol 1010 | — | — |
| 28 | VII | 1 | " | 1.4 | 1,4-bis-(2-hydroxyethoxy)-benzene |
| 29 | VIII | 2 | MHPA | 1.6 | 1,1,1-trimethylolethane |
| | | 1 | dodecanedioic acid | | |
| 30 | VIII | 1.1 | Pripol 1010 | 0.5 | 4,4'-bis-(2-hydroxyethoxy)-diphenyl sulphone |
| 31 | VIII | 0.55 | Pripol 1040 | 0.22 | " |
| 32 | VIII | 1.1 | Pripol 1010 | 0.5 | N,N'—bis-(2-hydroxyethoxy)-benzene-sulphonamide |
| 33 | VIII | 0.5 | Pripol 1040 | 0.22 | 1,1,1-trimethylolethane |
| 34 | VIII | 0.75 | fibran | — | — |
| 35 | IX | 0.5 | " | — | — |
| 36 | X | 1 | " | 0.4 | TCD-diol |
| 37 | X | 2 | " | 1.2 | " |
| 38 | X | 2 | " | 0.9 | 1,1,1-trimethylolethane |
| 39 | X | 2 | dodecanedioic acid | 1.2 | TCD-diol |
| 40 | XI | 0.7 | fibran | — | — |
| 41 | XI | 2 | dodecanedioic acid | 1.4 | TCD-diol |
| 42 | XI | 1.1 | oleic acid | — | — |
| 43 | XII | 0.33 | Pripol 1040 | — | — |
| 44 | XII | 2 | dodecanedioic acid | 1.4 | TCD-diol |
| 45 | XIII | 0.55 | Pripol 1010 | — | — |
| 46 | XIV | 0.33 | Pripol 1040 | — | — |
| 47 | XV | 1.1 | erucic acid | — | — |
| 48 | XV | 0.55 | Pripol 1010 | — | — |
| 49 | XVI | 2 | dodecanedioic acid | 1.2 | TCD-diol |
| 50 | XVI | 2 | " | 1.4 | " |
| 51 | XVII | 1.5 | fibran | — | — |
| 52 | XVII | 2 | " | — | — |
| 53 | XVIII | 2 | " | — | — |
| 54 | XVIII | 3 | " | — | — |
| 55 | XIX | 0.7 | " | — | — |
| 56 | XX | 1.5 | " | — | — |
| 57 | XX | 3 | MHPA | 1.8 | 1,6-hexanediol |
| 58 | XXI | 1.2 | dodecanedioic acid | 2 | 1,12-octadecanediol |
| 59 | XXI | 1.4 | dodecanedioic acid | 2 | " |
| 60 | XXI | 1.2 | Pripol 1010 | 2 | " |
| 61 | XXII | 1.2 | " | 2 | " |
| 62 | XXIII | 1.2 | dodecanedioic acid | 2 | " |
| 63 | XXIII | 1.4 | " | 2 | polyglycol P 400 |
| 64 | XXIII | 0.4 | " | 1 | " |
| 65 | XXIV | 1 | ricinoleic acid | 1.1 | TCD-diol |
| 66 | XXVII | 2 | ricinoleic acid | 1.1 | 1,6-hexanediol |
| 67 | XXVII | — | — | 2.2 | oleyl alcohol |
| 68 | XXVII | 0.2 | Pripol 1010 | 2.5 | " |
| 69 | XXIII | 1.2 | fibran | — | — |
| 70 | XXIII | 1.5 | " | — | — |
| 71 | XXIII | 2 | " | — | — |
| 72 | XXIV | 3 | erucic acid | — | — |
| 73 | XXV | 2 | hexahydrophthalic anhydride | 1.4 | triethylene glycol |
| 74 | XXV | 2 | " | 1.4 | tetraethylene glycol |
| 75 | XXV | 2.5 | " | 1 | triethylene glycol |
| | | | | 0.6 | trimethylolpropane |
| 76 | XXVI | 0.9 | dodecanedioic acid | 1.5 | tetraethylene glycol |
| 77 | XXVI | 1.4 | " | 2 | " |
| 78 | XXVII | 4 | " | 3.5 | " |
| 79 | XXVIII | 4.5 | " | 3 | " |
| 80 | XXIX | 4 | " | 2.5 | " |
| | | | | 0.8 | oleyl alcohol |

Printing inks were prepared analogously to Examples 1–4 from the dyestuffs of Examples 5–80, the viscosity being adjusted in each case by varying the amount of resin to correspond to a flow time of 23 seconds from the DIN 3 cup. The printing inks gave yellow to orange. deeply coloured prints, the strikethrough behaviour corresponding to that of the printing inks according to Examples 1–4.

EXAMPLE 81

11.3 g of 2,2-bis-(4-aminophenyl)-propane, 100 ml of water and 28 ml of 1N hydrochloric acid are stirred for a short time and the mixture is cooled to 0° C. by adding ice. Diazotization is carried out by adding an aqueous solution of 7 g of sodium nitrite dropwise, and the excess nitrous acid is destroyed with sulphamic acid after 15 minutes. The diazotized mixture is clarified and a solution of 42 g of 5-cyano-2-hydroxy-4-methyl-1-oleyl-pyrid-5-one and 3 g of a commercially available wetting agent based on sodium dioctylsulphosuccinate (aerosol OT) in 350 ml of water and 14 ml of 10N sodium hydroxide solution is added dropwise at 0°–5° C. in the course of approximately one hour. After 10 hours at room temperature the mixture is heated to 50° C., whereupon complete coupling takes place. The resulting yellow dyestuff is filtered off with suction, washed with water and dried in vacuo at 50° C. This gives 53 g of a yellow substance of the formula

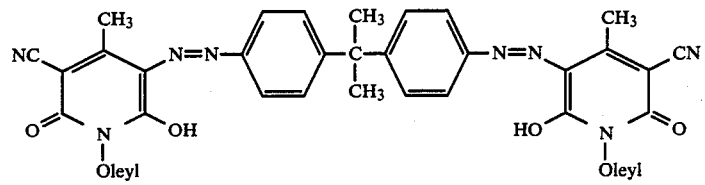

If six parts of the dyestuff and 31 parts of Erkazit 899 are dissolved in 63 parts of toluene a gravure printing ink is obtained which produces deep neutral yellow prints on paper which already exhibit a very advantageous strike-through behaviour. An analogous printing ink obtained from six parts of the dyestuff, 30 parts of Erkazit 899 and 63 parts of toluene and additionally containing a dispersion of 0.7 part of aerosol 380 gives equally deep prints and exhibits a further reduced tendency to striking through.

EXAMPLE 82

15.2 g of 4-methyl-2-nitroaniline are stirred with 70 ml of 5N hydrochloric acid and diazotized in a customary manner. The diazotized mixture is clarified and added dropwise to a mixture composed of a solution of 42 g of 5-cyano-2-hydroxy-4-methyl-1-oleylpyrid-6-one in 200 ml of toluene, 70 ml of water, 6 g of succinic acid and 8 ml of 10N sodium hydroxide solution, the temperature being kept at 0°–10° C. by adding ice and the pH being kept at a value of 5.5 by adding sodium hydroxide solution dropwise. The coupling is complete after 15 minutes. The mixture is heated to 60° C. and the toluene phase is separated off. After drying over sodium sulphate and clarification, part of the toluene is removed by distillation. This gives 130 g of a solution containing approximately 56 g of the dyestuff of the following formula:

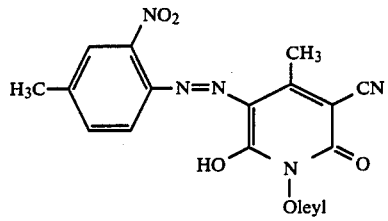

A toluene gravure printing ink prepared therefrom in accordance with Example I gives deep yellow prints, but exhibits a somewhat worse strike-through behaviour than the printing ink according to Example 1. On the other hand, a printing ink prepared analogously to Example 2 exhibits an excellent strike-through behaviour even on paper having a low weight per unit area.

Dyestuffs were prepared from the components listed in Table 3 analogously to the method described in Example 82, and from these dyestuffs printing inks were prepared which exhibit the same pattern of properties as the printing inks according to Example 82.

TABLE 3

| Exmp. No. | Diazo component | Coupling component |
|---|---|---|

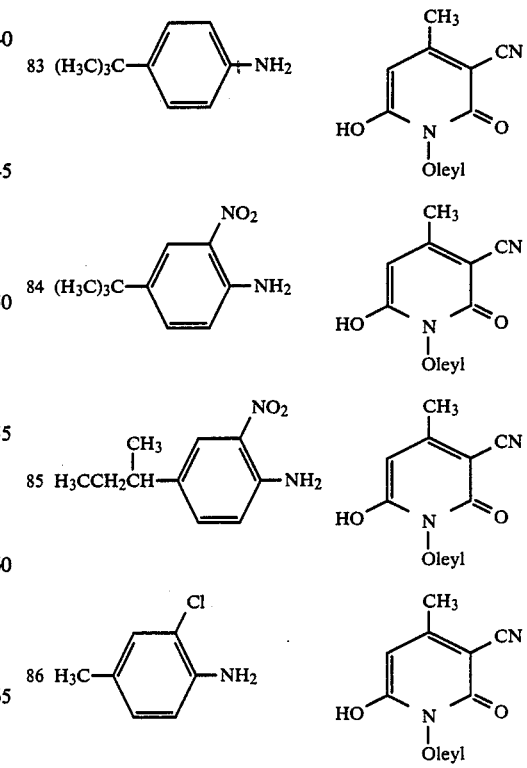

TABLE 3-continued

| Exmp. No. | Diazo component | Coupling component |
|---|---|---|
| 87 | 3-Cl-4-CH3-aniline | 4-CH3-3-CN-6-OH-1-Oleyl-pyridone |
| 88 | 2-CH3-4-CH3-aniline | 4-CH3-3-CN-6-OH-1-Oleyl-pyridone |
| 89 | 4-(H3C)3C-aniline | 4-CH3-3-CN-6-OH-1-(2-ethylhexyl)-pyridone |
| 90 | 4-(H3CCH2CH(CH3))-aniline | 4-CH3-3-CN-6-OH-1-(2-ethylhexyl)-pyridone |
| 91 | 2-NO2-4-(H3CCH2CH(CH3))-aniline | 4-CH3-3-CN-6-OH-1-(2-ethylhexyl)-pyridone |

We claim:

1. A dyestuff which is obtained by reacting a pyridone azo dyestuffs of the formula

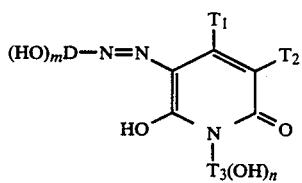

in which
D denotes the radical of a diazo component,
$T_1$ denotes alkyl, aryl or —$COOT_4$,
$T_2$ denotes H, —CN, —$COOT_4$ or —CONH—$T_5$-$(OH)_n$,
$T_4$ denotes hydrogen or alkyl,
if n is 0, $T_3$ and $T_5$ each independently represent $C_1$-$C_{22}$-alkyl, $C_2$-$C_{22}$-alkenyl, $C_3$-$C_7$-cycloalkyl, benzyl, phenethyl, $C_2$-$C_{18}$-alkoxyalkyl, phenoxy-$C_1$-$C_{22}$-alkyl or phenoxy-$C_2$-$C_{18}$-alkoxy? alkyl and
if n is 1, 2, 3 or 4,$T_3$ and $T_5$ each independently represent a $C_2$-$C_{18}$-alkyl or $C_2$-$C_{18}$-alkyl which is interrupted by 1-6 oxygen atoms and
m and n denote 0, 1, 2, 3 or 4, subject to the proviso that the sum of m+n is 1, 2, 3 or 4, with oxalic acid or a carboxylic acid of the formula $$[G']\text{-}(COOH)_a$$

in which G' denotes an aliphatic or aromatic hydrocarbon radical having 1-51 carbon atoms and a denotes 2, 3 or 4 or a carboxylic acid of the formula $$[G'']\text{-}(OCH_2CH_2\text{-}COOH)_{a'}$$

in which G'' denotes a saturated or unsaturated hydrocarbon radical having 2 to 20 carbon atoms or a saturated or unsaturated hydrocarbon radical in which the carbon chain can be interrupted by 1-9 non-adjacent oxygen atoms and a' denotes 2, 3, 4 or 5 to form an ester linkage between at least two identical or different pyridone azo dyestuffs.

2. A dyestuff according to claim 1 obtained by reacting pyridone azo dyestuffs of the formula

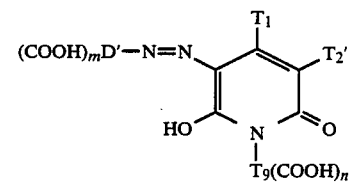

in which
$T_2'$ denotes H, —CN or —$COOT_4$,
if n is 0, $T_9$ represents $C_1$-$C_{22}$-alkyl, $C_2$-$C_{22}$-alkenyl, $C_3$-$C_7$-cycloalkyl, benzyl, phenethyl, $C_2$-$C_{18}$-alkoxyalkyl, phenoxy-$C_1$-$C_{22}$-alkyl or phenoxy-$C_2$-$C_{18}$-alkoxyalkyl,
if n is 1, 2, 3 or 4,$T_9$ represents a $C_1$-$C_{12}$-alkyl, and
D' denotes the radical of a diazo component, with a dihydroxy or polyhydroxy compound of the formula $$[G'_1]\text{—}(OH)_{a1}$$

in whch $G'_1$ denotes an aliphatic hydrocarbon radical having 2-54 C atoms and Al denotes 2, 3, 4 or 5 or a diglycol or polyglycol having 3-20 ethylene oxide units, dipropylene or polypropylene glycol having 3-20 propylene oxide units, a copolymer formed from ethylene oxide and propylene oxide, 1,4-bis-(2-hydroxyethoxy)-benzene, 4,4'-bis-(2-hydroxyethoxy)-diphenyl sulphone, 2,2-bis-[4-(2-hydroxyethoxy)-phenyl]-propane, 1,5-,2,6-, 2,7-or 1,7-bis-(2-hydroxyethoxy)-naphthaline to form an ester linkage between at least two identical or different pyridone azo dyestuffs.

3. A dyestuff of the formula $$[P_{y1}]\text{—}N\!=\!N\text{—}L'\text{—}N\!=\!N\text{—}[P_{y2}]$$

in which [$P_{y1}$] and [$P_{y2}$] denote pyridone radicals which, in one of their tautomeric forms, correspond to the formulae

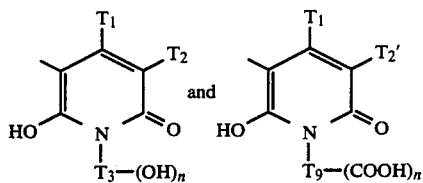

in which
  $T_1$ denotes alkyl, aryl or —COOT$_4$,
  $T_2$ denotes H, —CN, —COOT$_4$, or —CONH—T$_5$-(OH)$_n$,
  if n is 0, $T_3$ and $T_5$ each independently reprsents C$_1$–C$_{22}$-alkyl, C$_2$–C$_{22}$-alkenyl, C$_3$–C$_7$-cycloalkyl, benzyl, phenethyl, C$_2$–C$_{18}$-alkoxyalkyl, phenoxy-C$_1$–C$_{22}$-alkyl or phenoxy-C$_2$–C$_{18}$-alkoxy-alkyl, if n is 1,2,3 or 4, $T_3$ represents a C$_2$–C$_{18}$-alkyl or C$_2$–C$_{18}$-alkyl which is intrrupted by 1–6 oxygen atoms,
  $T_2'$ denotes H, —CN or —COOT$_4$
  $T_4$ denotes hydrogen or alkyl,
  if n is 0, $T_9$ represents C$_1$–C$_{22}$-alkyl, C$_2$–C$_{22}$-alkenyl, C$_3$–C$_7$-cycloalkyl, benzyl, phenethyl, C$_2$–C$_{18}$-alkoxyalkyl, phenoxy-C$_1$–C$_{22}$-alkyl or phenoxy-C$_2$–C$_{18}$-alkoxyalkyl, if n is 1, 2, 3 or 4, $T_9$ represents a C$_1$–C$_{12}$-alkyl,
n denotes 0,1,2,3 or 4 and
L' rrepresents

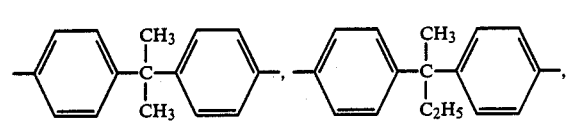

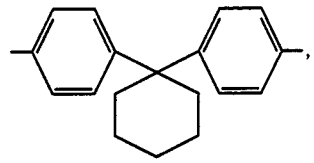

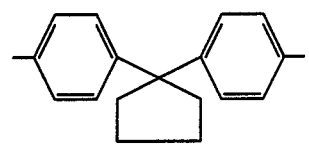

wherein the cyclopentylene and cyclohexylene radicals are unsubstituted or are substituted C$_1$–C$_4$-alkyl, and the phenylene radical is unsubstituted or substituted by C$_1$–C$_4$-alkyl, —NO$_2$ and Cl.

* * * * *

UNITED STATES PATENT AND TRADEMARK OFFICE
CERTIFICATE OF CORRECTION

PATENT NO. : 4,739,042
DATED : April 19, 1988
INVENTOR(S) : Manfred Lorenz, et al It is certified that error appears in the above-identified patent and that said Letters Patent is hereby corrected as shown below:

| | |
|---|---|
| Col. 2, line 25 | After "$C_6$" insert -- - -- |
| Col. 2, line 40 | After "which" insert --is-- |
| Col. 3, line 7 | Beginning of sentence after "5" insert -- - -- |
| Col. 3, line 19 | After first formula insert --or-- |
| Col. 3, line 58 | After "$C_{18}$-" delete "of suitable radicals $T_3$ or $T_5$ are" |
| Col. 4, line 22 | After $C_{18}$" insert -- - -- |
| Col. 7, line 16 | Correct spelling of --hydroxymethyltricyclodecane-- |
| Col. 7, line 27 | After "4" insert -- - -- |
| Col. 9, line 8 | Before "Py1]" insert -- [-- |
| Col. 14, line 1 | Delete "$L_7$" first instance and substitute --$L_{7'}$-- |
| Col. 14, line 11 | After "hydrogen" insert --$C_1$-$C_{22}$-alkyl-- |
| Col. 14, line 60 | Delete "[py2]" and substitute --[$Py_2$] |
| Col. 16, line 48 | Delete middle of structure and substitute -- 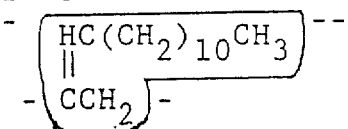 -- |
| Col. 19, line 44 | Correct --available-- |
| Col. 27, line 68 | Delete "alkoxy?alkyl" and substitute --alkoxy-alkyl-- |
| Col. 28, line 49 | Correct --which-- |
| Col. 28, line 50 | Delete "Al" and substitute --$a_1$-- |

UNITED STATES PATENT AND TRADEMARK OFFICE
CERTIFICATE OF CORRECTION

PATENT NO. : 4,739,042

DATED : April 19, 1988

INVENTOR(S) : Manfred Lorenz, et al

It is certified that error appears in the above-identified patent and that said Letters Patent is hereby corrected as shown below:

Col. 28, line 57    Delete "I,5" and substitute --1,5--
Col. 29, line 15    Correct --represents--
Col. 29, line 20    Correct --interrupted--

Signed and Sealed this

Twenty-first Day of February, 1989

Attest:

DONALD J. QUIGG

Attesting Officer    Commissioner of Patents and Trademarks